J. R. BOWERS.
Brick Kiln.

No. 66,206.

2 Sheets—Sheet 1.

Patented July 2, 1867.

Witnesses:

Inventor:

J. R. BOWERS.
Brick Kiln.
No. 66,206.
2 Sheets—Sheet 2.
Patented July 2, 1867.
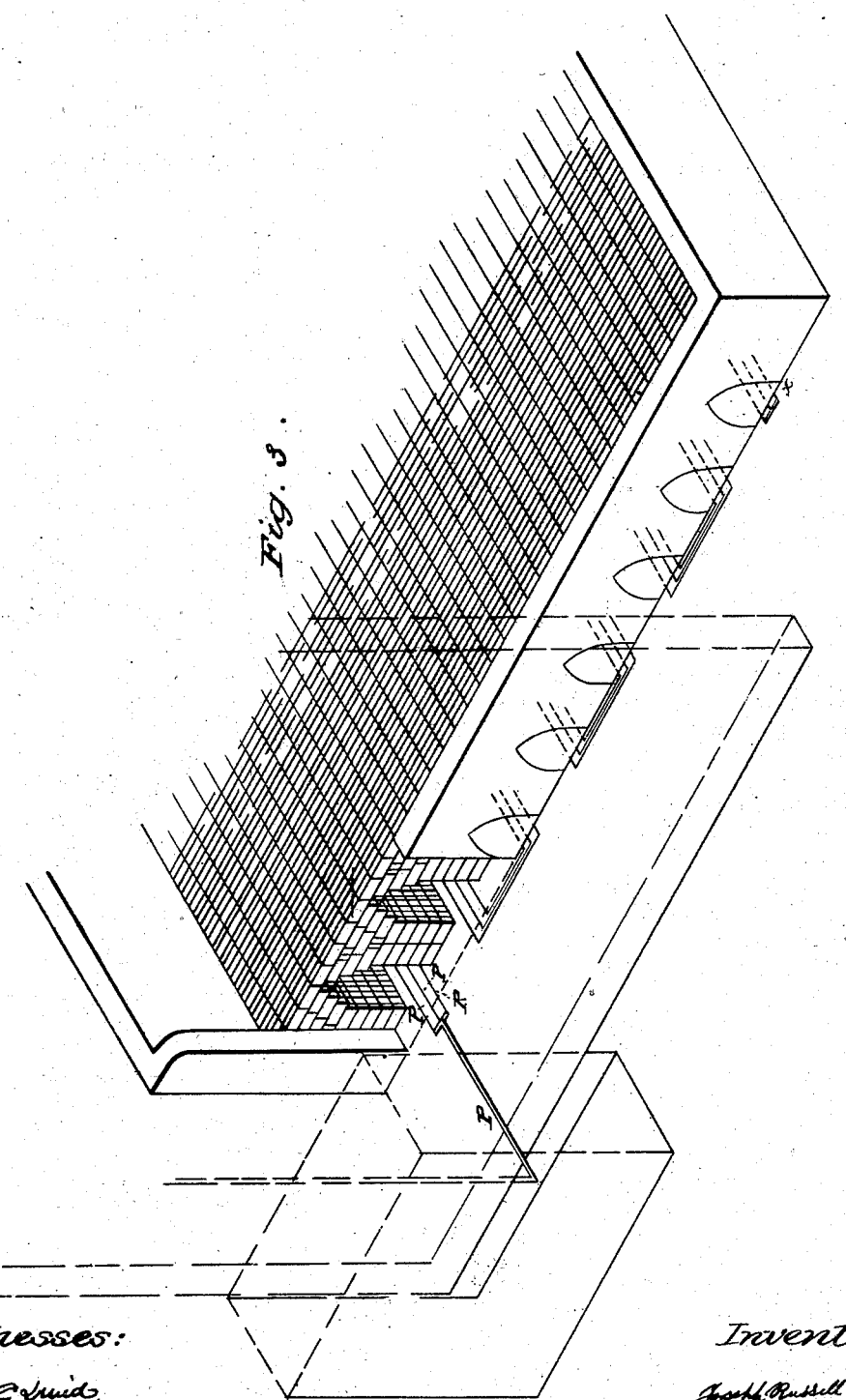
Witnesses:
Inventor:

United States Patent Office.

JOSEPH R. BOWERS, OF CONCORD, NEW HAMPSHIRE.

Letters Patent No. 66,206, dated July 2, 1867.

IMPROVEMENT IN DRYING BRICKS.

The Schedule referred to in these Letters Patent and making part of the same.

Be it known that I, JOSEPH RUSSELL BOWERS, of Concord, in the county of Merrimack, and State of New Hampshire, have invented a new and improved method of Drying Bricks, and apparatus for that purpose; and I do hereby declare that the following is a full and exact description thereof, reference being had to the accompanying drawings, of which—

Figure 1:
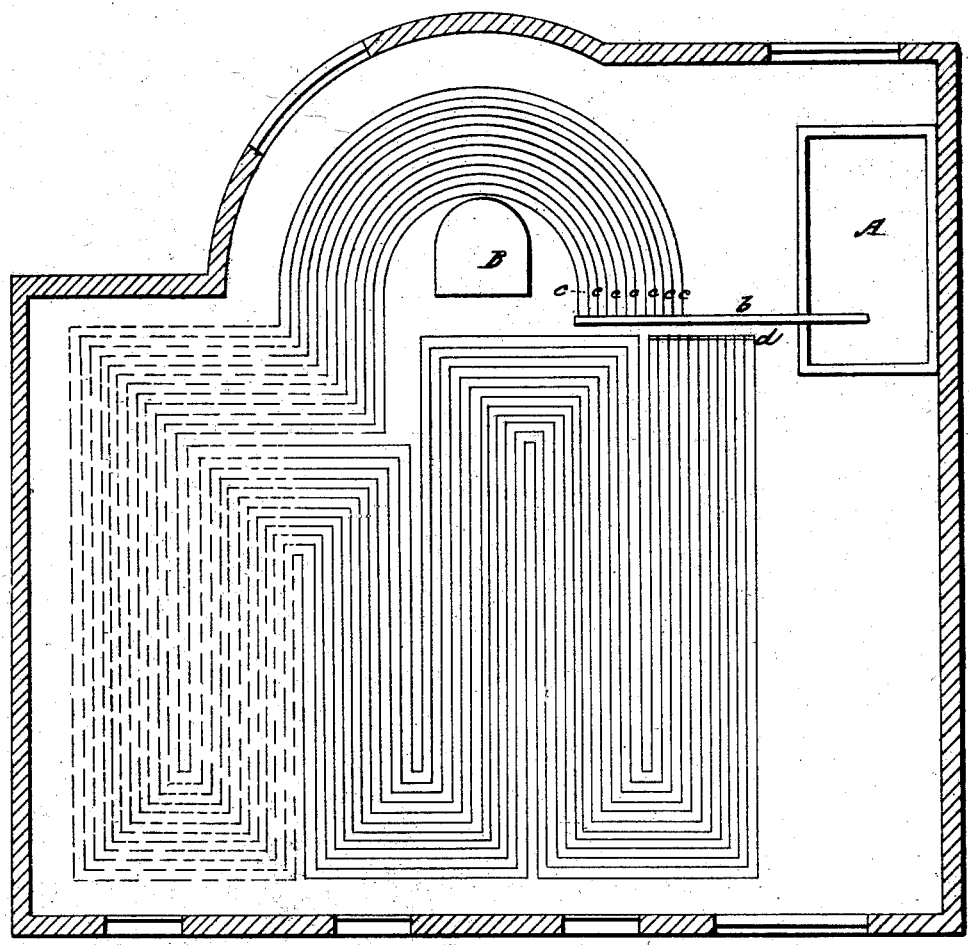
Figure 2:
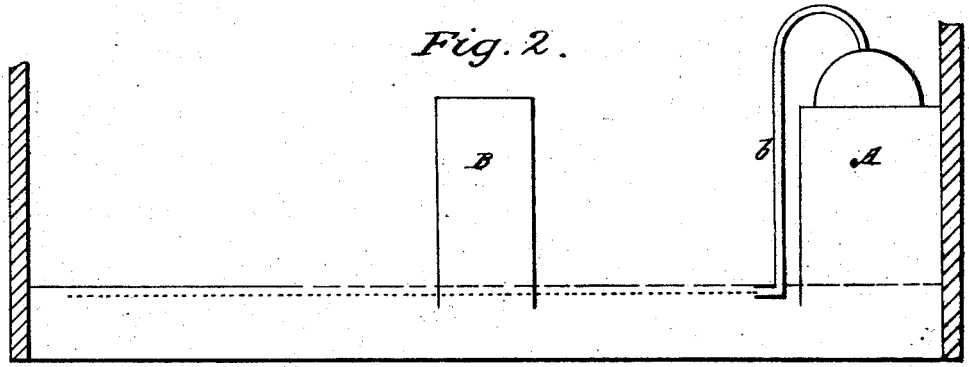

Figure 1 is a ground plan.
Figure 2 is a section.
Figure 3 is an isometrical drawing of a portion of a brick-kiln, showing the mode of piping the arches for the purpose claimed above.

The nature of my invention consists in applying steam or hot-air pipes beneath the surface of the mixing-bed, and drying-ground of brick-yards, and applying heat by means thereof to the purpose of manufacturing bricks.

To enable others skilled in the art to make and use my invention, I will proceed to describe its construction and operation, referring to the accompanying drawings and the letters of reference marked thereon.

I construct my drying-ground in a rectangular form, as the drying-ground is usually constructed in brick-yards, and I enclose the same with the mortar-mill and mixing-bed, in an enclosure to exclude rain or snow, or cold, and retain warmth. The walls may be as shown upon the ground plan, fig. 1, or in any other plan, as may be most convenient for working the brick-yard. For the purpose of supplying steam or hot air, I prepare a boiler or hot-air furnace, which may be located at a convenient place within said enclosure. For illustration I locate the same at A. From said boiler or hot-air furnace I carry the large pipe $b$, and from said large pipe I carry off the small pipes $c$ $c$, passing round the mortar-mill, which for illustration I locate at B, beneath the bed where I mix my mortar for the mill. I also continue said small pipes beneath the surface of my drying-ground, as shown by the black and dotted lines in the figure, at a distance of about six inches apart, and at a depth of about three inches below the surface, and I roll the surface of said drying-ground hard and smooth for the reception of my bricks when freshly struck. I pass steam or hot air from said boiler or furnace through said pipes, regulating the supply thereof by means of necessary stop-cocks, and the heat thereof keeps my said mixing-bed free from frost in cold or freezing weather, and keeps my said drying-ground warm and dry in wet weather in the summer, and in cold and freezing weather in the winter. I strike my bricks and deposit them on the surface of said drying-ground in the same manner as they are usually deposited for drying by solar heat, and they are evenly and gradually dried by artificial heat applied by means of said pipes. The condensed steam escapes from said pipes at the point $d$. By thus applying artificial heat to the mixing-bed and drying-ground of my brick-yard in winter, or to the drying-ground alone in summer, I am enabled to manufacture bricks for the kiln at all seasons of the year without interruption from rain or cold.

Outside of my enclosure, above described, I construct my brick-kiln. I construct the arches thereof in the usual form, as shown by fig. 3 of the accompanying drawings. From my boiler or hot-air furnace I carry the pipe P, and from said pipe I carry off the small pipes $p$ $p$ $p$, through the first arch, and return them through the second; carry them back through the third, and continue them thus back and forth through said arches till they pass through the last arch, emerging, say, at the point $x$. I carry up my scoring round said kiln as fast as said kiln is built or laid up. I pass the steam or hot air from my boiler or furnace through said pipes P and $p$, regulating the supply thereof by stop-cocks, and thus apply artificial heat to the drying of said kiln. Having dried my bricks sufficiently for the purpose upon my drying-ground above described, I set them at once in the kiln, without baking, and complete the drying of the same by said steam or hot-air pipes, while said kiln is in process of building, so that when said kiln is completed, said pipes are withdrawn and the kiln is ready for burning  During the process of building, said kiln is protected from the weather as kilns usually are.

In the drawing, fig. 3, a portion of one side only of my kiln is shown, and through a space left in the scoring I show two of my arches, and the manner in which I pass my pipes into the same; and the manner in which said pipes are returned when they emerge from the arches of the kiln at either end is the same as shown in the drawing.

What I claim as my invention, and desire to secure by Letters Patent, is—

The application of artificial heat by means of steam or hot-air pipes, when such pipes pass beneath the surface of the drying-ground, and are constructed as described for the purpose of drying bricks.

JOSEPH RUSSELL BOWERS.

Witnesses:
CHAS. C. LUND,
ISAAC A. HILL.